United States Patent
Kono

(10) Patent No.: US 11,144,150 B2
(45) Date of Patent: Oct. 12, 2021

(54) TACTILE SENSATION PROVIDING APPARATUS

(71) Applicant: KYOCERA Corporation, Kyoto (JP)

(72) Inventor: Kenji Kono, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/085,009

(22) Filed: Oct. 30, 2020

(65) Prior Publication Data

US 2021/0048911 A1 Feb. 18, 2021

Related U.S. Application Data

(62) Division of application No. 13/700,119, filed as application No. PCT/JP2011/002983 on May 27, 2011, now abandoned.

(30) Foreign Application Priority Data

May 27, 2010 (JP) ................. 2010-121877

(51) Int. Cl.
*G06F 3/041* (2006.01)
*G06F 3/01* (2006.01)
*G06F 3/0488* (2013.01)

(52) U.S. Cl.
CPC ............ *G06F 3/0414* (2013.01); *G06F 3/016* (2013.01); *G06F 3/041* (2013.01); *G06F 3/0416* (2013.01);
(Continued)

(58) Field of Classification Search
CPC ........ G06F 3/016; G06F 3/041; G06F 3/0414; G06F 3/0416; G06F 3/04886
See application file for complete search history.

(56) References Cited

U.S. PATENT DOCUMENTS 7,205,978 B2  4/2007 Poupyrev et al.
7,312,791 B2  12/2007 Hoshino et al.
(Continued)

FOREIGN PATENT DOCUMENTS

JP  2003-288158 A  10/2003
JP  2004-086733 A  3/2004
JP  2008-130055 A  6/2008

OTHER PUBLICATIONS

International Search Report issued in PCT/JP2011/002983; dated Jun. 21, 2011.

*Primary Examiner* — Alexander Eisen
*Assistant Examiner* — Cory A Almeida
(74) *Attorney, Agent, or Firm* — Studebaker & Brackett PC

(57) ABSTRACT

A tactile sensation providing apparatus and method facilitate avoidance of the feeling of strangeness and includes a touch sensor, a load detection unit configured to detect a pressure load on a touch face of the touch sensor, a tactile sensation providing unit configured to provide a click sensation and a release sensation to the touch face, and a control unit configured to control that the tactile sensation providing unit. The click sensation is provided when detecting the pressure load satisfying a pressure load provided within a button object for providing the click sensation in a button object. The release sensation is provided when detecting the pressure load satisfying a pressure load provided within a button object for providing the release sensation in a button object.

12 Claims, 11 Drawing Sheets

(52) U.S. Cl.
CPC ............... *G06F 3/04886* (2013.01); *G06F 2203/04105* (2013.01)

(56) References Cited

U.S. PATENT DOCUMENTS

| | | | |
|---|---|---|---|
| 2004/0108995 A1 | 6/2004 | Hoshino et al. | |
| 2006/0109256 A1* | 5/2006 | Grant | G06F 3/0485 345/173 |
| 2008/0150905 A1 | 6/2008 | Grivna et al. | |
| 2010/0023857 A1 | 1/2010 | Mahesh et al. | |
| 2010/0156818 A1 | 6/2010 | Burrough et al. | |
| 2010/0271326 A1* | 10/2010 | Hu | G06F 3/0414 345/174 |
| 2012/0299859 A1* | 11/2012 | Kinoshita | G06F 3/04186 345/173 |

* cited by examiner

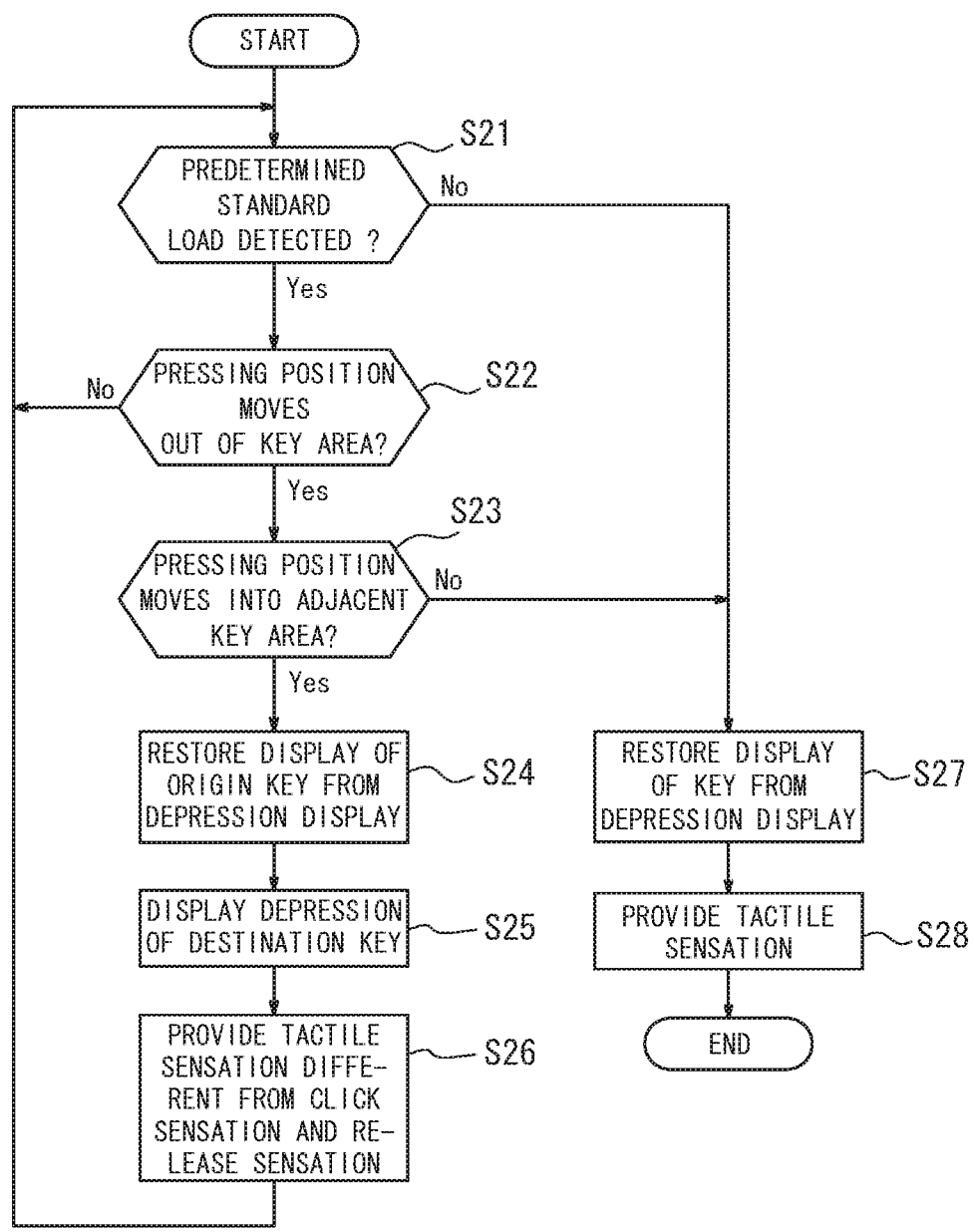

ary feedback method that does not provide a tactile sensation but instead vibrating the touch sensor when the touch sensor detects a contact (for example, see Patent Documents 1, 2).

TACTILE SENSATION PROVIDING APPARATUS

CROSS REFERENCE TO RELATED APPLICATION

This present application is a Divisional of U.S. patent application Ser. No. 13/700,119 filed on Nov. 26, 2012, which is the U.S. National Phase Entry of International Application No. PCT/JP2011/002983 filed May 27, 2011, which claims priority to and the benefit of Japanese Patent Application No. 2010-121877 filed on May 27, 2010, the entire contents of which are incorporated herein by reference.

TECHNICAL FIELD

The present invention relates to an apparatus for providing a tactile sensation in response to reception of an input to a touch sensor.

BACKGROUND ART

In recent years, there are mobile terminals such as mobile phones that employ input apparatuses having touch sensors such as touch panels, touch switches or the like, as input apparatuses such as operation units, switches and the like configured to detect operations by operators. Such input apparatuses having the touch sensors are popularly employed not only by the mobile terminals but also by information equipments such as calculators, ticket vending machines, home electric appliances such as microwaves, TV sets, lighting equipments, industrial equipments (FA equipments) and the like.

There are known a variety of types of those touch sensors, such as a resistive film type, a capacitive type, an optical type and the like. However, touch sensors of these types detect a contact by a finger or a stylus pen and, unlike mechanical push-button switches, touch sensors themselves are not physically displaced when touched.

Therefore, the operator may not obtain feedback in response to the operation to the touch sensor. Since the operator may not obtain an operation sensation in operation, the operator may not determine whether the operation is appropriately detected by the terminal. In using such a terminal, accordingly, the operator is likely to repeat the operation to the same position and may feel stressed.

As a terminal that prevents such an unnecessary repetitious operation, there is a terminal that generates sounds when the touch sensor detects a contact. There is also known a terminal that enables visual or auditory confirmation by changing a display state such as color of an input object such as an input button or the like (hereinafter, referred simply as an "object") graphically depicted in the display unit corresponding to a position where the contact is detected.

However, such auditory feedback may be difficult to be confirmed in a noisy environment and is not applicable when the equipment being used is in a silent mode. In addition, in using visual feedback, when the operator is inputting by the finger, if the input object displayed on the display unit is small, the operator may not be able to confirm the change in the display state, as a view of the input object is blocked by the finger.

In order to deal with such problems, there is suggested a feedback method relying on neither the auditory—nor visual

RELATED ART DOCUMENTS

Patent Documents

Patent Document 1: Japanese Patent Laid-Open No. 2003-288158
Patent Document 2: Japanese Patent Laid-Open No. 2008-130055

SUMMARY OF INVENTION

Technical Problem

According to the technique disclosed in Patent Documents 1 and 2 described above, when the finger or the like lightly contacts the touch sensor, the contact is received as an input and vibration is conducted to the finger of the operator or the like. Therefore, the operator performing the input operation to the input apparatus may perceive, through vibration, that the operation to the touch sensor is received.

However, the technique disclosed in Patent Documents 1 and 2 described above, through vibration in a similar manner to the auditory and visual feedback, merely notify the operator of a fact that the operation to contact the touch sensor is received by the input apparatus.

Incidentally, when the input apparatus that notifies reception of the input through vibration as described above has a push-type button (object) such as a mechanical push button graphically depicted in the display unit, the depicted push-type button may mislead the operator to think that the operator must push the touch sensor hard (perform a push operation).

When the operator pushes the touch sensor hard (performs push operation), the conventional input apparatuses described above receive a light contact (touch) of the finger or the like before hard-pushing of the touch sensor as an input and provide vibration. Since the tactile sensation obtained by operating the graphically depicted push-type button is different from a tactile sensation obtained by operating an actual button, the operator may have a feeling of strangeness.

An object of the present invention, in consideration of such a condition, is to provide a tactile sensation providing apparatus that enables the operator to operate without having the feeling of strangeness, by providing a realistic tactile sensation matching the object as feedback based on an operation to the touch sensor.

Solution to Problem

In order to achieve the above object, a tactile sensation providing apparatus according to a first aspect of the present invention includes a touch sensor, a load detection unit configured to detect a pressure load on a touch face of the touch sensor, a tactile sensation providing unit configured to provide a click sensation and a release sensation to the touch face, and a control unit configured to control that the tactile sensation providing unit provides the click sensation when detecting the pressure load satisfying a pressure load for providing the click sensation in a button object. The control unit controls that the tactile sensation providing unit provides the release sensation when detecting the pressure load satisfying a pressure load for providing the release sensation in a button object.

In a method for providing a tactile sensation to a tactile sensation apparatus according to a second aspect of the present invention, the tactile sensation apparatus including a touch sensor, a load detection unit, a tactile sensation providing unit, and a control unit, the method comprises detecting, by the load detection unit, a pressure load applied to a touch face of the touch sensor, and providing, by the tactile sensation providing unit, a click sensation and/or a release sensation to the touch face. In response to the load detection unit detecting that the pressure load is provided within a button object and satisfies a pressure load for providing the click sensation, the control unit controls the tactile sensation providing unit to provide the click sensation, and in response to the load detection unit detecting that the pressure load is provided within a button object and satisfies a pressure load for providing the release sensation, the control unit controls the tactile sensation providing unit to provide the release sensation.

Effect of the Invention

According to the present invention, the tactile sensation providing apparatus enabling an operator to operate without having a feeling of strangeness, by providing a realistic tactile sensation matching an object as feedback based on an operation to the touch sensor, may be provided.

BRIEF DESCRIPTION OF DRAWINGS

FIG. 4 is a flowchart illustrating an operation by the tactile sensation providing apparatus according to the embodiment of the present invention when the contact position shifts out of the key area or into an adjacent key area;

DESCRIPTION OF EMBODIMENT

An embodiment of the present invention will be described with reference to the accompanying drawings.

Figure 1:
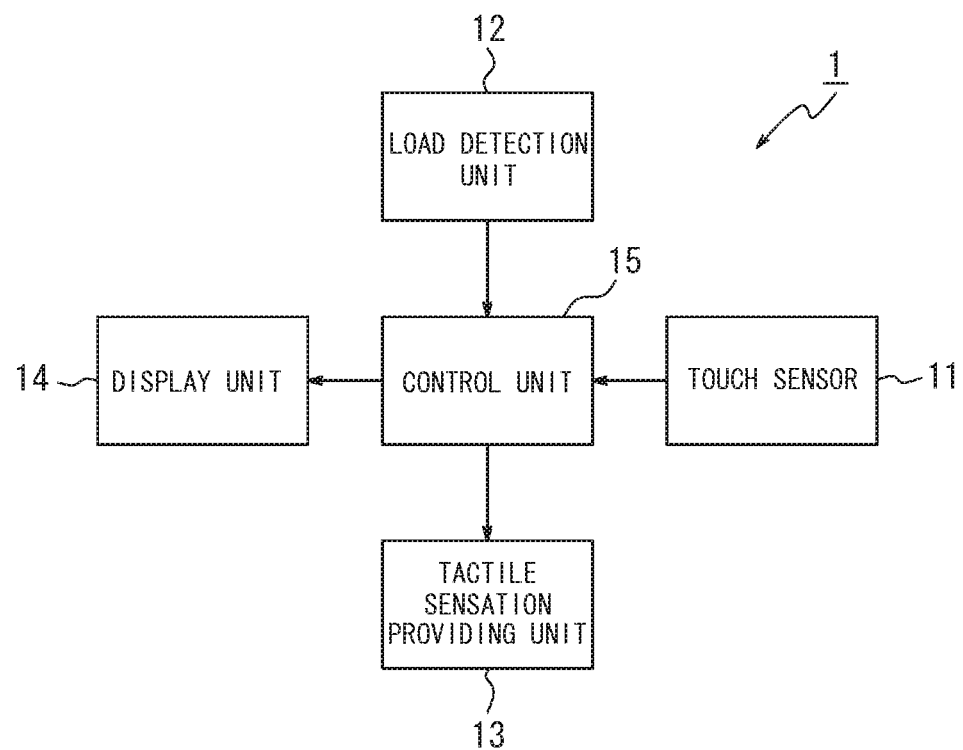
FIG. 1 is a block diagram illustrating a schematic configuration of a tactile sensation providing apparatus according to one embodiment of the present invention.

FIG. 1 is a functional block diagram illustrating a schematic configuration of a tactile sensation providing apparatus according to one embodiment of the present invention. The tactile sensation providing apparatus according to the present embodiment is applicable to any input apparatus, such as an input apparatus of a mobile phone used for inputting characters or numbers, an input apparatus of an ATM machine at a bank and an input apparatus of a ticket vending machine at a train station, that receive an operation by an operator using a touch sensor.

As illustrated in FIG. 1, a tactile sensation providing apparatus 1 according to the present embodiment has a touch sensor 11, a load detection unit 12, a tactile sensation providing unit 13, a display unit 14, and a control unit 15 configured to control overall operations.

The touch sensor 11 detects a touch (contact) to a touch face of the touch sensor by an operator's finger or the like. The touch sensor 11 may include, for example, a resistive film type, a capacitive type, an optical type or the like. The touch sensor 11 is made of transmissive material and provided on a front face of the display unit 14 to be used as a sensor for detecting a contact operation by the operator to an object such as a key or a button displayed in the display unit 14. The load detection unit 12 detects a pressure load applied to the touch face of the touch sensor 11 and is preferably configured by using an element such as, for example, a strain gauge sensor, a piezoelectric element or the like, which linearly reacts to a load. The tactile sensation providing unit 13 vibrates the touch sensor 11 and is configured by using, for example, a piezoelectric vibrator. The display unit 14 displays an object of an input button or the like such as a push-button switch (push-type button switch) and may be configured by using, for example, a liquid crystal display panel, an organic EL display panel or the like.

Figure 2A:
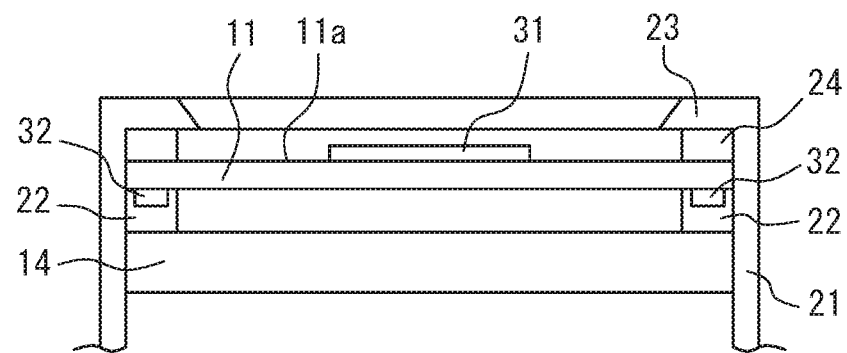
FIGS. 2A and 2B are diagrams illustrating an exemplary housing structure of the tactile sensation providing apparatus according to the embodiment of the present invention.
Figure 2B:
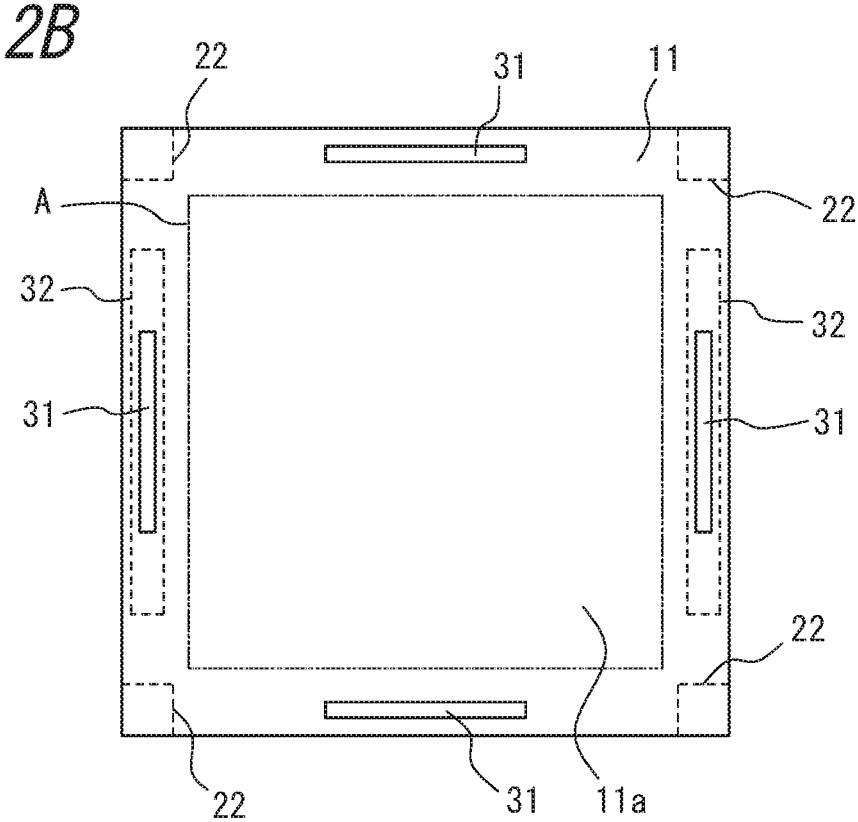

FIGS. 2A and 2B illustrate an exemplary housing structure of the tactile sensation providing apparatus 1 illustrated in FIG. 1; FIG. 2A is a cross-sectional view of a main section, and FIG. 2B is a plane view of the main section. The display unit 14 is contained in a housing 21. The touch sensor 11 is disposed on the display unit 14 via insulators 22 made of elastic members. In the tactile sensation providing apparatus 1 according to the present embodiment, the display unit 14 and the touch sensor 11 are rectangular shaped in a planar view. Also, according to the present embodiment, the touch sensor 11 is held on the display unit 14 via the insulators 22 arranged at four corners outside a display area A of the display unit 14 illustrated by a chain double-dashed line in FIG. 2B.

In addition, the housing 21 is provided with an upper cover 23 covering a surface area of the touch sensor 11 outside the display area of the display unit 14. An insulator 24 made of elastic member is arranged between the upper cover 23 and the touch sensor 11.

The touch sensor 11 illustrated in FIGS. 2A and 2B have a surface member having a touch face 11a formed of, for example, a transparent film or the glass and a rear face member formed of the glass or acryl. The touch sensor 11 is designed such that, when the touch face 11a is pressed down, a pushed part is slightly bent (strained) relative to pressing force or a structure itself is bent slightly.

A strain gauge sensor 31 to detect a load (the pressing force) applied on the touch sensor 11 is provided, adhered or the like, on a surface of the touch sensor 11 at a position close to each periphery to be covered by the upper cover 23. In addition, a piezoelectric vibrator 32 to vibrate the touch sensor 11 is provided, adhered or the like, on the rear face of the touch sensor 11 at a position close to a periphery on each of two opposing sides. That is, the tactile sensation providing apparatus illustrated in FIGS. 2A and 2B have the load detection unit 12 illustrated in FIG. 1 configured by using four strain gauge sensors 31 and the tactile sensation providing unit 13 configured by using two piezoelectric vibrators 32. In addition, the tactile sensation providing unit 13 vibrates the touch sensor 11 such that the touch face 11a is vibrated. It is to be noted that the housing 21, the upper cover 23 and the insulator 24 illustrated in FIG. 2A are omitted in FIG. 2B.

Figure 3:
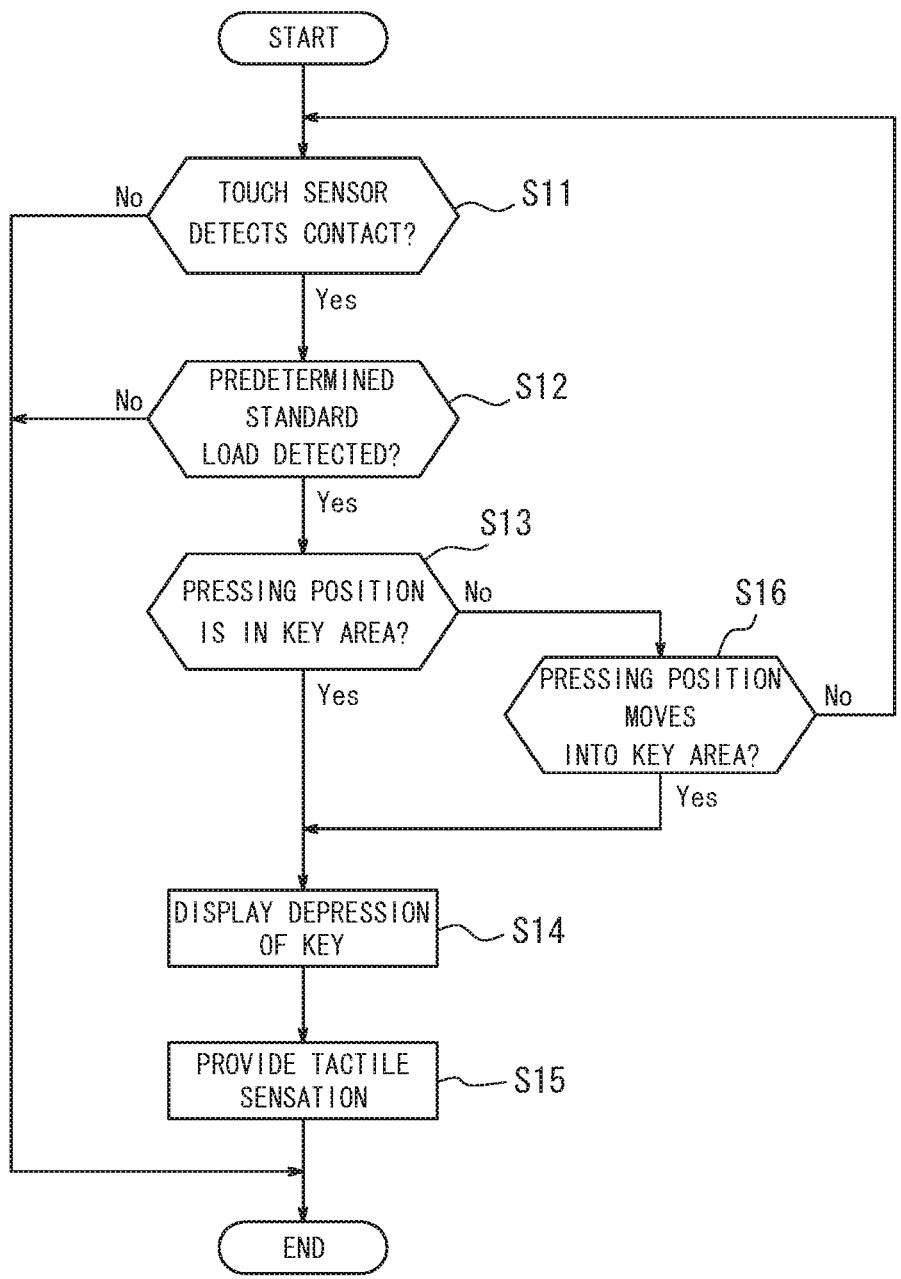
FIG. 3 is a flowchart illustrating an operation by the tactile sensation providing apparatus according to the embodiment of the present invention when a contact position shifts into a key area.

FIG. 3 and FIG. 4 are flowcharts illustrating operations by the tactile sensation providing apparatus 1 according to the present embodiment. The tactile sensation providing apparatus 1 according to the present embodiment provides a tactile sensation when a contact position based on position information from the touch sensor 11 shifts into an area corresponding to an object (a key or the like) while the pressure load satisfies a predetermined standard load.

The flowchart in FIG. 3 illustrates an operation to provide the tactile sensation when the contact position detected by the tactile sensation providing apparatus 1 is at a position (within an area) corresponding to the key or the like, or when the contact position shifts from outside of the position (area) corresponding to the key or the like to inside of the position (within the area) corresponding to the key or the like. In order to start the operation illustrated in the flowchart in FIG. 3, the object such as the key or the like is displayed in the display unit 14 of the tactile sensation providing apparatus 1 before the contact to the touch face of the touch sensor 11 is detected. The object according to the present embodiment may be a graphic image indicating a position for detecting the contact to the operator. For example, an image having a graphically depicted number or character on a key top is displayed as the object on the display unit 14.

When the operation of the tactile sensation providing apparatus 1 according to the present embodiment is initiated, the control unit 15 monitors a contact to the touch sensor 11 and a pressure load detected by the load detection unit 12. At step S11, when the touch sensor 11 detects a contact by a pressing object (pressing means) such as an operator's finger, a stylus pen or the like, the control unit 15 proceeds to step S12.

At step S12, the control unit 15 determines whether the pressure load detected by the load detection unit 12 is increased by an operation of the touch sensor 11 by the operator and satisfies the predetermined standard load. The load detection unit 12 detects the pressure load from, for example, an average output value of the four strain gauge sensors 31. Here, it is preferable that, based on the pressure load of a usual pressing operation by the operator, the pressure load satisfying the predetermined standard load is preset to be, for example, 1 N (Newton) and resettable thereafter. The predetermined standard load, for preventing from receiving an unintended light contact by the operator as an input, is set avoiding an excessively small value. Also, in order to provide a sense of pressure for a realistic tactile sensation described below, the predetermined standard is set avoiding an excessively small value in consideration of the pressure load of an intended operation by the operator (for example, an average value). Even when the contact to the touch sensor 11 is detected at step S11, the operation according to the present embodiment is not performed if the pressure load detected by the load detection unit 12 does not satisfy the predetermined standard load at step S12.

When the pressure load satisfying the predetermined standard load is detected at step S12, the control unit 15, based on the position information from the touch sensor 11, determines whether a position of the pressure load is inside the predetermined area (step S13). Here, "the position of the pressure load" (hereinafter, referred to simply as a "pressing position") indicates a position of the contact detected by the touch sensor 11 while the load detection unit 12 is detecting the pressure load satisfying the predetermined standard load. According to the present embodiment, the "predetermined area" is a position where an object such as the key or the button indicating an area for receiving an operation is displayed on the display unit 14. Also, the "predetermined area" corresponds to the position on the touch sensor 11. Since the "predetermined area" corresponds to the key or the like, it is referred to simply as a "key area" appropriately in the following description.

When the pressing position is positioned inside the key area at step S13, the control unit 15 changes a display state of the object corresponding to the pressing position on the display unit 14 (step S14). Such change of the display state of the object at step S14 may be, for example, a change of a state of the graphically depicted object such that it looks like a key depression when a mechanical push-button switch is pressed down by the operator (hereinafter, referred to as a "depression display" of the key). Alternatively, it is also possible to change the display state of the object by momentarily changing color or brightness of the object, in order to clearly indicate reception of the input by the operator.

After displaying depression of the key at step S14, the control unit 15 drives the tactile sensation providing unit 13 with a predetermined drive signal such that the touch sensor 11 is vibrated in a predetermined vibration pattern providing a first tactile sensation (step S15). The tactile sensation providing unit 13 drives, for example, two piezoelectric vibrators 32 in phase. At this time, preferably, the tactile sensation providing apparatus 1 receives the operation as the input to the object.

In order to provide a realistic click sensation as the first tactile sensation described above to the operator at step S15, the tactile sensation providing apparatus 1 stimulates a tactile sensation of the operator while stimulating a pressure sensation by performing the following operation. That is, the tactile sensation providing apparatus 1 stimulates the pressure sensation until the pressure load applied to the touch sensor 11 satisfies the predetermined standard load to provide the tactile sensation (for example, 1 N) and, when the pressure load satisfies the predetermined standard load, stimulates the tactile sensation by driving the piezoelectric element 32 with a predetermined drive signal such that the touch face 11a is vibrated. Thereby, the tactile sensation providing apparatus 1 may provide the operator with a click sensation similar to that obtained when pressing a button switch such as the push-button switch (push-type button switch). Accordingly, even with the push-button switch graphically depicted on the display unit laminated on a rear face of the touch sensor, the operator may carry out an operation to the touch sensor 11 obtaining a realistic click sensation similar to that obtained when operating an actual push-button switch. Therefore, the operator would not have a feeling of strangeness. Moreover, since the operator may carry out the operation in conjunction with perception to "have pressed" the touch sensor 11, it may prevent erroneous inputs.

The drive signal to provide the click sensation described above, that is, a certain frequency, a cycle (wavelength), a waveform and vibration amplitude to stimulate the tactile sensation may be set appropriately according to the click sensation to be provided. For example, in order to provide the click sensation represented by a metal dome switch employed by a mobile terminal, the tactile sensation providing unit 13 is driven by the drive signal of, for example, a sine wave with a frequency of 170 Hz, for 1 cycle. The tactile sensation providing unit 13 is driven with the drive signal described above such that the touch face 11a is vibrated by approximately 15 μm under the pressure load satisfying the predetermined standard load. Thereby, the realistic click sensation similar to that obtained when clicking an actual key may be provided to the operator.

On the other hand, when the pressing position is positioned outside the key area at step S13, the control unit 15 determines, based on the position information from the touch sensor 11, whether the pressing position has shifted into the key area (step S16). In this case, that is, the control unit 15 determines whether the contact position detected by the touch sensor 11 has shifted into the key area while the pressure load detected by the load detection unit 12 is satisfying the predetermined standard load. This state, from a point of view of an operation carried out by the operator, corresponds to an operation to shift a position of the finger or the like applying pressure load satisfying the predetermined standard load on the touch panel 11 from a position elsewhere than the object such as the key or the like to a position of the object.

When the pressing position has not shifted into the key area at step S16, the control unit 15 returns to step S11 to determine whether the contact to the touch sensor 11 is still being detected. When the contact to the touch sensor 11 is no longer detected, it may be considered that the operator has removed the finger or the like from the touch sensor 11. Therefore, the operation according to the present embodiment ends. When the contact to the touch sensor 11 is still being detected, the control unit 15 performs the operation from step S12 described above.

On the other hand, when the pressing position has shifted into the key area at step S16, the control unit 15 changes the display state of the object corresponding to the pressing position (step S14) and provides the tactile sensation (step S15). That is, when the control unit 15 detects that the pressing position satisfying the predetermined standard load shifts into the predetermined area, the control unit 15 controls drive of the tactile sensation providing unit 13 such that the first tactile sensation is provided to the pressing object pressing the touch face. In detail, when the contact position detected by the touch sensor 11 shifts into the predetermined area while the pressure load detected by the load detection unit 12 satisfies the predetermined standard load, the control unit 15 controls drive of the tactile sensation providing unit 13 such that the tactile sensation is provided to the pressing object pressing the touch face.

The flowchart illustrated in FIG. 4 starts in a state that the touch sensor 11 detects the contact at the position (area) corresponding to the object displayed on the display unit 14 while the load detection unit 12 is detecting the pressure load satisfying the predetermined standard load. That is, when the operation illustrated in FIG. 4 starts, the pressing position is preliminarily positioned in the key area and, simultaneously, the pressure load satisfies the predetermined standard load. The flowchart in FIG. 4 illustrates an operation performed when the pressing position inside the key area moves out of the key area or into a key area of an adjacent key.

FIG. 4, as described above, also illustrates the operation performed when the pressing position shifts out of the key area into another key area adjacent thereto. Accordingly, in order to start the operation illustrated in FIG. 4, a plurality of objects such as the keys are preliminarily displayed on the display unit 14 of the tactile sensation providing apparatus 1. It is assumed that, among the plurality of objects of the keys or the like being displayed, at least two objects are displayed adjacent to each other. That is, as a necessary condition to perform the operation illustrated in FIG. 4, at least in a part of the display of the objects on the display unit 14, a plurality of keys such as, for example, a numerical keypad of a mobile phone or a general keyboard of a PC are arranged adjacent to one another.

When the operation of the tactile sensation providing apparatus 1 illustrated by the flowchart in FIG. 4 starts, the control unit 15 first determines whether the pressure load detected by the load detection unit 12 is still satisfying the predetermined standard load (step S21).

When it is determined at step S21 that the pressure load is no longer satisfying the predetermined standard load, the control unit 15 changes the display state of the object being in the depression display in response to reception of the input by the operator to an original display before the depression display and displays the object on the display unit 14 (step S27). In restoring the display state of the object at step S27, it may be considered to change the graphical image of the object from the depression display displayed at step S14 in FIG. 3 to a display indicating recovery of the key from depression when pressure by the operator on the mechanical push-button switch is released. In this case also, in order to clearly indicate that reception of the operation by the operator is stopped, that is, the input by the operator is canceled, the display state may be changed momentarily by changing color or the brightness.

After restoring the display state of the key from the depression display at step S27, the control unit 15 drives the tactile sensation providing unit 13 with the predetermined drive signal such that the touch sensor 11 is vibrated in a predetermined vibration pattern and a second tactile sensation (release sensation) is provided (step S28). That is, when the control unit 15 detects that the pressing position satisfying the predetermined standard load shifts outside the predetermined area, controls drive of the tactile sensation providing unit 13 such that the second tactile sensation is provided to the pressing object.

The drive signal to drive the tactile sensation providing unit 13 to provide the release sensation as the second tactile sensation may be either the same as, or different from, the drive signal (for the click sensation) used at step S15 in FIG. 3. For example, the frequency of the drive signal (for the click sensation) when the tactile sensation providing apparatus 1 receives the input may be at 170 Hz, while the frequency of the drive signal in releasing may be at 125 Hz. Thereby, a realistic release sensation different from the click sensation and obtained when releasing the actual key may be provided to the operator. As described above, in releasing after the click sensation provided in response to the operation applying the pressure, the release sensation paired with the click sensation may be provided by, in the same manner as the method in operation applying the pressure, driving the tactile sensation providing unit 13 with the predetermined drive signal such that the touch sensor 11 is vibrated in the predetermined vibration pattern. Accordingly, in combination with the click sensation in pressing, the release sensation more similar to that of the push-button switch may be provided to the operator.

On the other hand, when it is determined at step S21 that the pressure load is still satisfying the predetermined standard load, the control unit 15, based on the position information from the touch sensor 11, determines whether the pressing position has shifted out of the key area (step S22). In this case, that is, the control unit 15 determines whether the contact position detected by the touch sensor 11 shifts out of the key area while the pressure load detected by the load detection unit 12 is satisfying the predetermined standard load. This state, from the point of view of the operation carried out by the operator, corresponds to an operation to shift the position of the finger or the like applying pressure load satisfying the predetermined standard load on the touch panel 11 from a position corresponding to the object such as the key or the like to a position outside of the object.

When the pressing position has not shifted out of the key area at step S22, the control unit 15 returns to step S21 to determine whether the pressure load is still satisfying the predetermined standard load. When it is determined at step S21 that the pressure load is no longer satisfying the predetermined standard, the control unit 15 performs processes at step S27 and step S28 as described above.

On the other hand, when the pressing position has shifted out of the key area at step S22, the control unit 15 determines whether the pressing position has shifted into the adjacent key area (step S23). At step S23, that is, the control unit 15 determines whether the contact position detected by the touch sensor 11 has shifted from the key area of the object, where the contact is currently detected, to the key area of the adjacent object while the pressure load detected by the load detection unit 12 is satisfying the predetermined standard load.

At step S23, when the pressing position does not shift into the adjacent key area, the control unit 15 performs the processes at step S27 and step S28. The operation proceeds from step S23 to step S27 when the pressing position shifts out of the key area (Yes at step S22) to outside of the adjacent key area (No at step S23), that is, to a position where there is no object of the key. In this case, accordingly, the control unit 15 restores the display state of the object being in the depression display in response to reception of the input to the original display (step S27) and drives the tactile sensation providing unit 13 with the predetermined drive signal such that the release sensation is provided (step S28).

On the other hand, when the pressing position shifts from the key area into the adjacent key area at step S23, the control unit 15 changes the display state of the object being in the depression display in response to reception of the input to the original display (step S24). Subsequently, the control unit 15 changes the display state of the adjacent key area, where the pressing position has shifted to, on the display unit 14 (step S25).

After the depression display of the key at step S25, the control unit 15 drives the tactile sensation providing unit 13 with a predetermined drive signal such that the touch sensor 11 is vibrated in a predetermined vibration pattern and a tactile sensation different from the click sensation provided at step S15 and the release sensation provided at step S28 is provided (step S26). Here, the tactile sensation provided at step S26 is different from the click sensation to notify the operator that the pressing position has shifted into the key area and the release sensation to notify that the pressing position has shifted out of the key area and indicates that the pressing position has shifted out of a key area into an adjacent key area. Such a tactile sensation is preferably enables the operator to easily distinguish the tactile sensation from other tactile sensations and gives, for example, a flick sensation to the tactile sensation. However, the tactile sensation provided at step S26 is not limited to the "flick" sensation but may be any tactile sensation different from the click sensation and the release sensation described above provided by a different setting of the intensity of vibration and the frequency.

For example, the tactile sensation provided at step S26 may be different according to forms and the like of the object of the key area and the adjacent key area when the pressing position shifts therebetween at step S23. For example, when the pressing position shifts into the adjacent key area relatively large in size at step S23, it is possible to set to provide a great tactile sensation. Or, the tactile sensation may be different between when the pressing position shifts from a large object to a small object adjacent thereto and when the pressing position shifts from the small object to the large object adjacent thereto. Moreover, the tactile sensation may be different based on, instead of sizes of the objects before and after a slide operation, figures of these objects (appearance, that is, forms, patterns, colors and the like). Further, a different tactile sensation may be set based on not only the size and the figure of the objects before and after the slide operation but a speed of the slide operation moving between the objects adjacent to one another.

According to the present embodiment, as described above, when the control unit 15 detects that the pressing position satisfying the predetermined pressure load shifts out of the predetermined area directly into another predetermined area, the control unit 15 controls drive of the tactile sensation providing unit 13 such that the tactile sensation different from the first tactile sensation (for example, the click sensation) and the second tactile sensation (for example, the release sensation) is provided. In detail, when the touch sensor 11 detects a contact moving from inside a first key area straight into a second key area adjacent to the first key area while the load detection unit 12 is detecting the pressure load satisfying the predetermined standard load, the control unit 15 controls drive of the tactile sensation providing unit 13 such that a tactile sensation different from the first tactile sensation and the second tactile sensation is provided.

According to the present embodiment, therefore, when it is detected that the pressing position satisfying the predetermined standard load shifts out of the predetermined area directly into another predetermined area, neither the first nor the second tactile sensations is provided. Therefore, there is no risk for the first and the second tactile sensations to cancel each other. According to the present embodiment, also, since neither of the first tactile sensation nor the second tactile sensation is provided, there is no risk to provide the feeling of strangeness to the operator due to unwanted interference with waveforms of vibration generated when these tactile sensations are provided. Further, since the tactile sensation different from the first tactile sensation and the second tactile sensation is provided according to the present embodiment, when the slide operation across the key areas adjacent to one another is detected, the operator may recognize accordingly without fail.

According to the tactile sensation providing apparatus 1 of the present embodiment, therefore, since the tactile sensation different from the click sensation and the release sensation is provided, the operator may unfailingly recognize that an input by the slide operation across the key areas adjacent to one another is appropriately received.

Figure 5A:
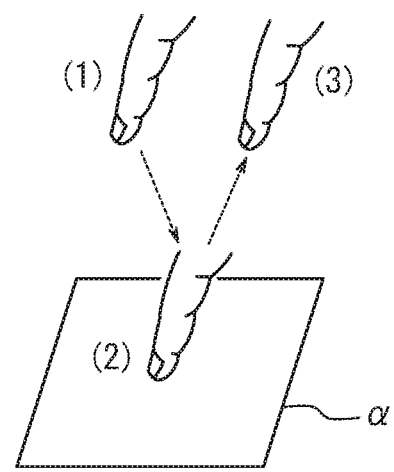
FIGS. 5A and 5B are diagrams illustrating examples of a pressure load detected by the tactile sensation providing apparatus and an operation by the tactile sensation providing apparatus according to the embodiment of the present invention.
Figure 5B:
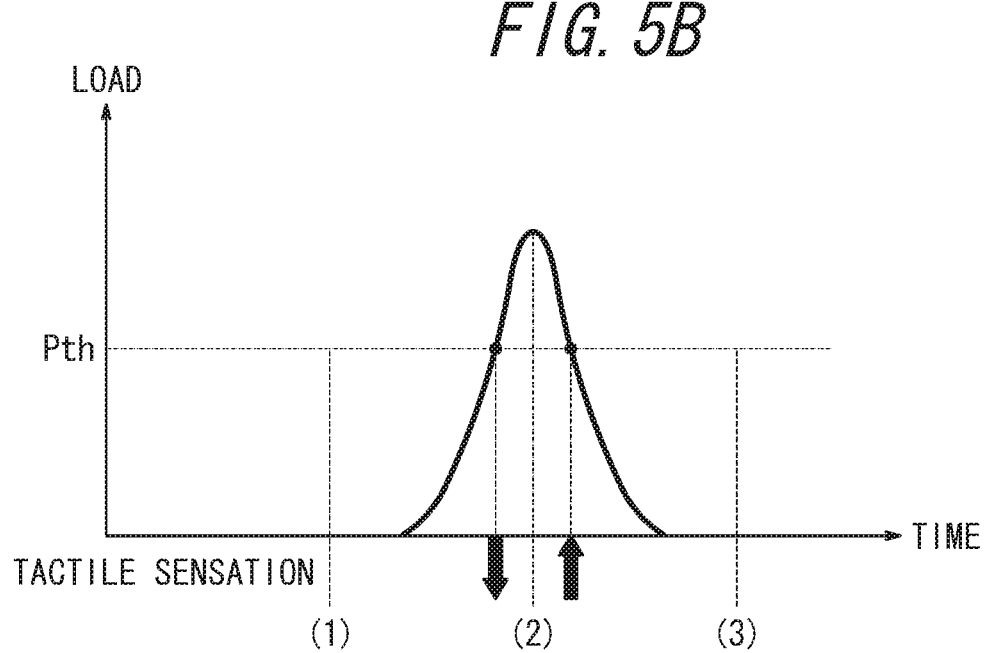

With reference to FIGS. 5A and 5B to FIGS. 10A and 10B, a specific example of the operation by the tactile sensation providing apparatus 1 according to the present embodiment described with reference to FIG. 3 and FIG. 4 will now be described. FIGS. 5A and 5B are diagrams illustrating examples of the pressure load detected by the tactile sensation providing apparatus 1 and the operation by the tactile sensation providing apparatus 1 according to the embodiment of the present invention.

FIG. 5A is a diagram schematically illustrating a state that the operators finger presses inside a key area α and then releases the pressure. In FIG. 5A, the key area α is an area of the touch sensor 11 and corresponds to a position displaying the object indicating an area, such as the key or button, for receiving an operation on the display unit 14. In FIG. 5A, characters such as "A" and "1" for an input usually provided on key tops of the objects are omitted. Also, a proportion of the key area α and the operator's finger is merely for convenience sake and does not reflect an actual proportion.

FIG. 5B is a graph illustrating a chronological change in the pressure load on the touch face of the touch sensor 11 detected by the load detection unit 12 when the operation illustrated in FIG. 5A is performed. In FIG. 5B, the "predetermined standard load" of the pressure load set forth above is represented by Pth. In addition, in FIGS. 5A and 5B, bracketed numbers represent an order of elapsed time. In the following description, for the sake of explanation, the bracketed numbers are referred to as "points".

As illustrated in FIG. 5A, a point (1) represents a state that the operator is about to press inside the key area α, a point (2) represents a state that the operator is pressing inside the key area α while applying the pressure load satisfying the predetermined standard load, and a point (3) represents a state that the operator releases the pressure. When these operations are carried out, as illustrated in FIG. 5B, the load detection unit 12 starts detecting the pressure load (that is, the operator starts pressing the touch face) between the point (1) and the point (2) and then stops detecting the pressure load (that is, the operator releases the pressure on the touch face) between the point (2) and the point (3). At the point (2), the load detection unit 12 detects the pressure load satisfying the predetermined standard load Pth. The pressure load satisfies the predetermined standard load Pth soon before the point (2) and stops satisfying the predetermined standard load Pth soon after the point (2).

As described with reference to FIG. 3 and FIG. 4, the tactile sensation providing apparatus 1 according to the present embodiment provides the first tactile sensation (for example, the click sensation) when detecting the pressure load satisfying the predetermined standard load Pth in the key area α and also provides the second tactile sensation (for example, the release sensation) when detecting that the pressure load in the key are a stops satisfying the predetermined standard load Pth. In FIG. 5B, a downward pointing arrow illustrated under a time axis at the time when the pressure load satisfies the predetermined standard load Pth soon before the point (2) indicates that the first tactile sensation (for example, the click sensation), which is a key depression sensation, is provided. Similarly, an upward pointing arrow illustrated under the time axis at the time when the pressure load stops satisfying the predetermined standard load Pth soon after the point (2) indicates that the second tactile sensation (for example, the release sensation), which is a key recovery sensation, is provided.

According to the present embodiment, the tactile sensation providing apparatus 1 provides the first tactile sensation when the pressure load satisfying the predetermined standard load Pth is detected in the key area, and provides the second tactile sensation when the pressure load stops satisfying the predetermined standard load Pth in the key area. That is, the predetermined standard load Pth is used as the standard of the pressure load for providing both of the first tactile sensation and the second tactile sensation. However, the standard load for providing the second tactile sensation may be set to be 50-80% lower than the standard load for providing the first tactile sensation in pressing. Thereby, when the same position (object) is clicked and then released, a sequential operation to apply and then to release the pressure synchronizes with timings to provide the tactile sensations, providing a realistic click sensation and release sensation without the feeling of strangeness.

As described above, when the pressure load detected on the touch face satisfies the predetermined standard load Pth (step S12) and the pressing position is positioned inside the key area α (step S13), the tactile sensation providing apparatus 1 provides the first tactile sensation (step S15). Similarly, when the pressing position is positioned inside the key area α (START in FIG. 4) and the pressure load detected on the touch face stops satisfying the predetermined standard load Pth (step S21), the tactile sensation providing apparatus 1 provides the second tactile sensation (step S24).

According to the tactile sensation providing apparatus 1 of the present embodiment, as described above, the operator may obtain the first tactile sensation when pressing the key area α applying the pressure load satisfying the predetermined standard load Pth and also the second tactile sensation when reducing the pressure load to stop satisfying the predetermined standard load Pth. Accordingly, even when operating to the touch sensor, the operator may obtain the tactile sensation similar to that obtained when operating the key or the like constructed by using a mechanical switch. The tactile sensation providing apparatus 1 of the present embodiment, as described above, when receiving a normal operation to one object, which is not the slide operation, may appropriately provide the click sensation and the release sensation.

Figure 6A:
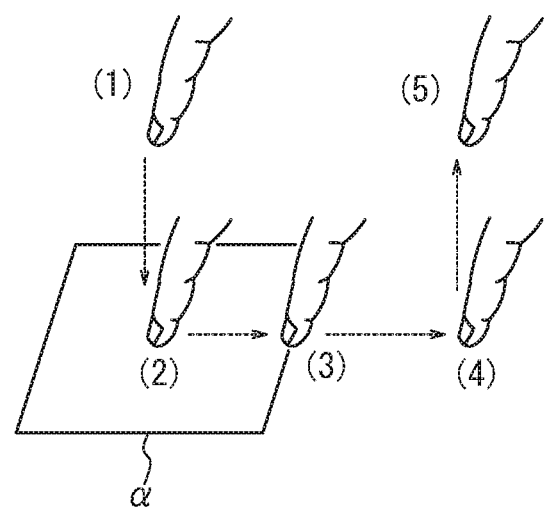
FIGS. 6A and 6B are diagrams illustrating other examples of the pressure load detected by the tactile sensation providing apparatus and the operation by the tactile sensation providing apparatus according to the embodiment of the present invention.
Figure 6B:
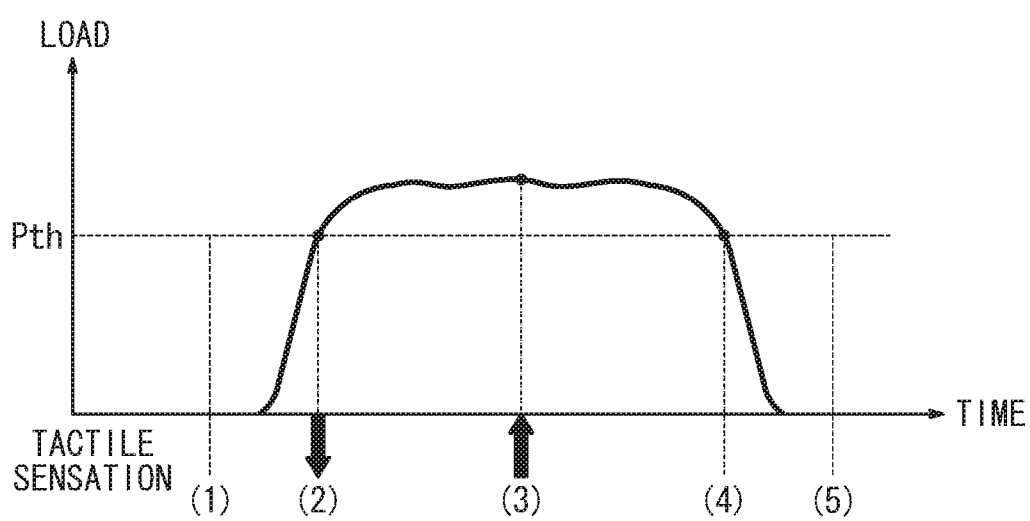

FIGS. 6A and 6B are diagrams illustrating other examples of the pressure load detected by the tactile sensation providing apparatus 1 and the operation by the tactile sensation providing apparatus 1 according to the embodiment of the present invention. In FIGS. 6A and 6B and thereafter, each symbol and the like has the same meaning as that described with reference to FIGS. 5A and 5B. FIG. 6A is a diagram schematically illustrating a state that the operator's finger presses inside the key area α and then shifts out of the key area α while maintaining the pressure and then releases the pressure.

As illustrated in FIG. 6A, the point (1) represents the state that the operator is about to press the key area α and the point (2) represents the state that the operator is pressing inside the key area α while applying the pressure load satisfying the predetermined standard load. The point (3) represents a state that the operator shifts the pressing position inside the key area α from the point (2) out of the key area α while applying the pressure load satisfying the predetermined standard load. The point (4) represents a state that the operator shifts the pressing position outside the key area a from the point (3) while applying the pressure load satisfying the predetermined standard load. The point (5) represents the state that the operator releases the pressure.

When these operations are carried out, as illustrated in FIG. 6B, the load detection unit 12 starts detecting the pressure load (that is, the operator starts pressing the touch face) between the point (1) and the point (2). At the point (2), the load detection unit 12 detects the pressure load satisfying the predetermined standard load Pth. Between the point (2) and the point (3), the pressure load continuously satisfies the predetermined standard load Pth (that is, the operator shifts the pressing position applying the pressure load satisfying the predetermined standard load Pth). Between the point (3) and the point (4) also, the load detection unit 12 continuously detects the pressure load satisfying the predetermined standard load Pth (that is, the operator shifts the pressing position applying the pressure load satisfying the predetermined standard load Pth). At the point (4), the pressure load stops satisfying the predetermined standard load Pth. Then, the load detection unit 12 stops detecting the pressure load (that is, the operator releases the pressure on the touch face) between the point (4) and the point (5).

As described with reference to FIG. 3 and FIG. 4, the tactile sensation providing apparatus 1 according to the present embodiment provides the first tactile sensation when detecting the pressure load satisfying the predetermined standard load Pth in the key area α and the second tactile sensation when the pressing position shifts out of the key area α while the pressure load satisfies the predetermined standard load Pth.

As illustrated in FIG. 6B, the downward pointing arrow illustrated under the time axis when the pressure load satisfies the predetermined standard load Pth at the point (2) indicates that the first tactile sensation is provided, and the upward pointing arrow illustrated under the time axis at the point (3) indicates that the second tactile sensation is provided. Although the pressure load stops satisfying the predetermined standard load Pth at the point (4), since neither a condition to provide the first tactile sensation nor that to provide the second tactile sensation is satisfied, the tactile sensation providing apparatus 1 does not provide these tactile sensations at this time.

As described above, when the pressure load detected on the touch face satisfies the predetermined standard load Pth (step S12) and the pressing position is positioned inside the key area α (step S13), the tactile sensation providing apparatus 1 provides the first tactile sensation (step S15). On the other hand, when the pressure load continuously satisfies the predetermined standard Pth (step S21) while the pressing position shifts out of the key area α (step S22), the tactile sensation providing apparatus 1 provides the second tactile sensation (step S24).

According to the tactile sensation providing apparatus 1 of the present embodiment, as described above, the operator may obtain the first tactile sensation when pressing the key area α applying the pressure load satisfying the predetermined standard load Pth and also the second tactile sensation when shifting the pressing position out of the key area α maintaining the pressure load satisfying the predetermined standard load Pth. Accordingly, in shifting the pressing position using the touch sensor, the operator may obtain the tactile sensations similar to those obtained when operating the key or the like constructed by using the mechanical switch. As described above, the tactile sensation providing apparatus 1 according to the present embodiment may appropriately provide the release sensation when receiving the slide operation from an object to a position with no object.

Figure 7A:
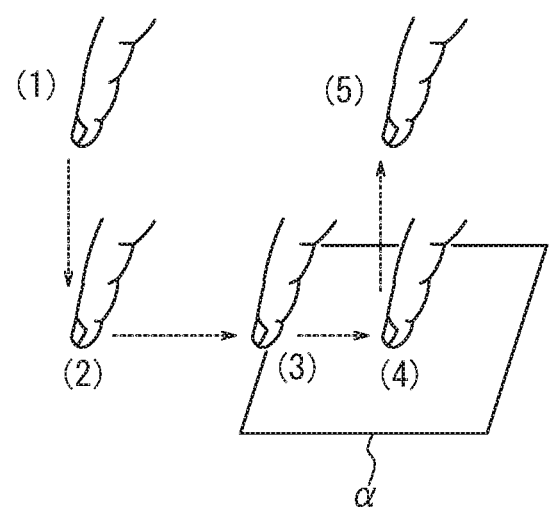
FIGS. 7A and 7B are diagrams illustrating other examples of the pressure load detected by the tactile sensation providing apparatus and the operation by the tactile sensation providing apparatus according to the embodiment of the present invention.
Figure 7B:
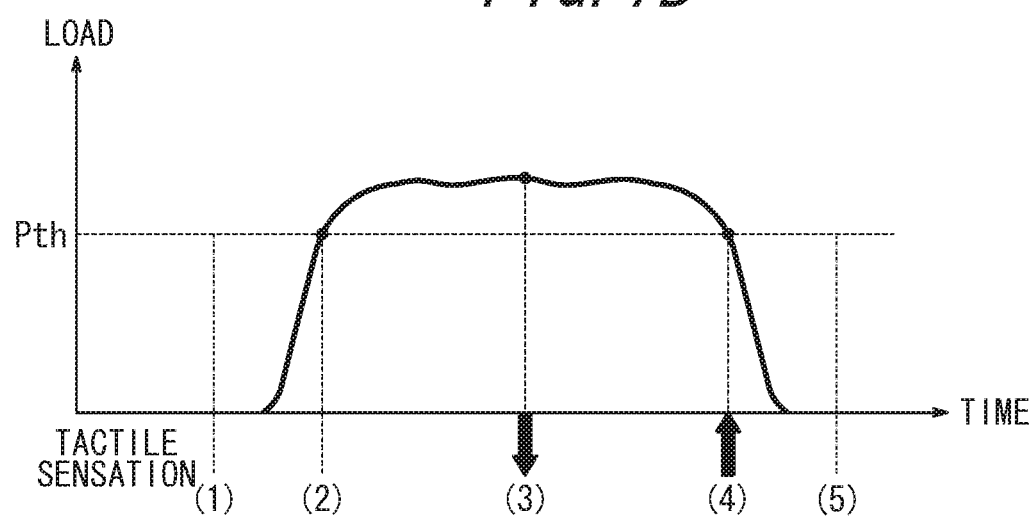

FIGS. 7A and 7B are diagrams illustrating still other examples of the pressure load detected by the tactile sensation providing apparatus 1 and the operation by the tactile sensation providing apparatus 1 according to the embodiment of the present invention. FIG. 7A is a diagram schematically illustrating a state that the operator's finger presses outside the key area α, shifts into the key area α maintaining the pressure, and then releases the pressure.

As illustrated in FIG. 7A, the point (1) represents a state that the operator is about to press outside the key area α and the point (2) represents the state that the operator is pressing outside the key area α applying the pressure load satisfying the predetermined standard load. The point (3) represents a state that the operator shifts the pressing position from outside of the key area α from the point (2) into the key area α maintaining the pressure load satisfying the predetermined standard load. The point (4) represents a state that the operator shifts the pressing position within the key area α from the point (3) maintaining the pressure load satisfying the predetermined standard load. The point (5) represents the state that the operator releases the pressure.

When these operations are carried out, as illustrated in FIG. 7B, the load detection unit 12 starts detecting the pressure load (that is, the operator starts pressing the touch face) between the point (1) and the point (2). At the point (2), the load detection unit 12 detects the pressure load satisfying the predetermined standard load Pth. Between the point (2) and the point (3), the pressure load continuously satisfies the predetermined standard load Pth (that is, the operator shifts the pressing position applying the pressure load satisfying the predetermined standard load Pth). Between the point (3) and the point (4) also, the load detection unit 12 continuously detects the pressure load satisfying the predetermined standard load Pth (that is, the operator shifts the pressing position applying the pressure load satisfying the predetermined standard load Pth). At the point (4), the pressure load stops satisfying the predetermined standard load Pth. Then, the load detection unit 12 stops detecting the pressure load (that is, the operator releases the pressure on the touch face) between the point (4) and the point (5).

As described with reference to FIG. 3 and FIG. 4, the tactile sensation providing apparatus 1 according to the present embodiment provides the first tactile sensation when the pressing position shifts into the key area α while the pressure load satisfies the predetermined standard load Pth and also the second tactile sensation when the pressure load detected in the key area α stops satisfying the predetermined standard load Pth.

As illustrated in FIG. 7B, the downward pointing arrow illustrated under the time axis at the point (3) indicates that the first tactile sensation is provided. Similarly, the upward pointing arrow illustrated under the time axis at the point (4) when the pressure load stops satisfying the predetermined standard load Pth indicates that the second tactile sensation is provided. Although the pressure load satisfies the predetermined standard load Pth at the point (2) (step S12), the pressing position is positioned outside the key area α (step S13) and has not shifted thereinto (step S16), neither the condition to provide the first tactile sensation nor that to provide the second tactile sensation is satisfied. Therefore, the tactile sensation providing apparatus 1 does not provide these tactile sensations at this time.

As described above, when the pressure load satisfies the predetermined standard load Pth (step S12) while the pressing position shifts into the key area α (step S16), the tactile sensation providing apparatus 1 provides the first tactile sensation (step S15). On the other hand, when the pressing position is positioned inside the key area α (START in FIG. 4) and the pressure load detected on the touch face stops satisfying the predetermined standard load Pth (step S21), the tactile sensation providing apparatus 1 provides the second tactile sensation (step S24).

According to the tactile sensation providing apparatus 1 of the present embodiment, as described above, the operator may obtain the first tactile sensation when shifting the pressing position into the key area α maintaining the pressure load satisfying the predetermined standard load Pth and also the second tactile sensation when reducing the pressure load in the key are a to stop satisfying the predetermined standard load Pth. The tactile sensation providing apparatus 1 according to the present embodiment, as described above, may appropriately provide the first tactile sensation when receiving the slide operation from a position with no object into the object.

Figure 8A:
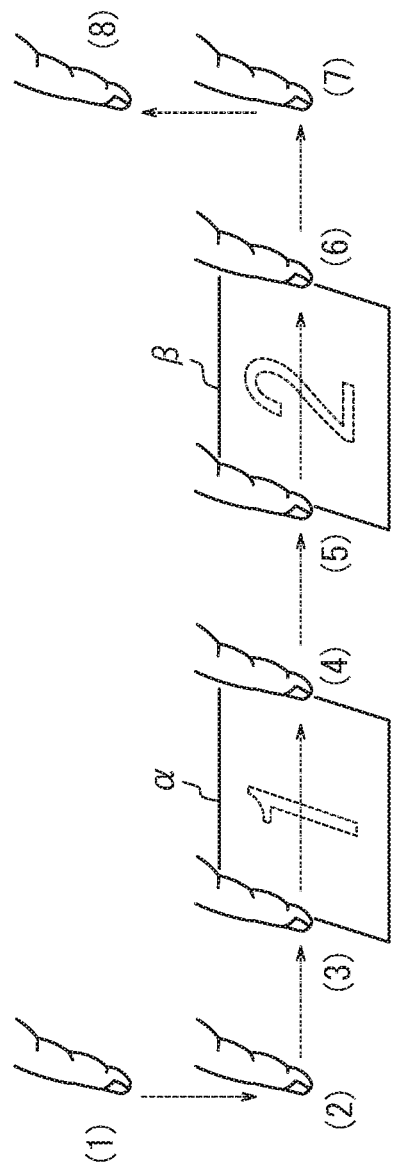
FIGS. 8A and 8B are diagrams illustrating other examples of the pressure load detected by the tactile sensation providing apparatus and the operation by the tactile sensation providing apparatus according to the embodiment of the present invention.
Figure 8B:
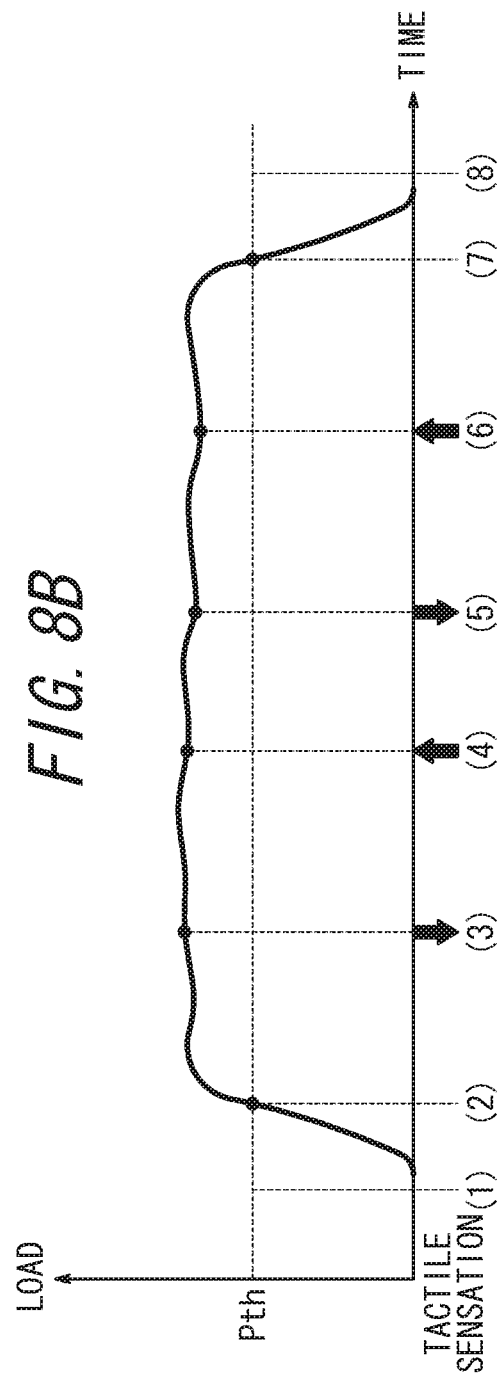

FIGS. 8A and 8B are diagrams illustrating still other examples of the pressure load detected by the tactile sensation providing apparatus 1 and the operation by the tactile sensation providing apparatus 1 according to the embodiment of the present invention. In FIGS. 8A and 8B, the object defined by the key area α and an object defined by a key area β are arranged having a space therebetween. Accordingly, the key areas of the objects in FIGS. 8A and 8B are not "adjacent" key areas described above. FIG. 8A is a diagram schematically illustrating a state that the operators finger presses outside the key area α, shifts into the key area α and then out of the key area α while maintaining the pressure, followed by a shift into the key area β and then out of the key area β while maintaining the pressure, and releases the pressure. When the pressing position shifts across a plurality of different key areas as descried above also, the tactile sensation providing apparatus 1 performs the same operation as described above.

As illustrated in FIG. 8A, the point (1) represents the state that the operator is about to press outside the key area α and the point (2) represents the state that the operator is pressing outside the key area α applying the pressure load satisfying the predetermined standard load. The point (3) represents a state that the operator shifts the pressing position into the key area α from the point (2) while applying the pressure load satisfying the predetermined standard load. The point (4) represents a state that the operator is shifting the pressing position inside of the key area α from the point (3) out of the key area α while applying the pressure load satisfying the predetermined standard load.

In addition, the point (5) represents a state that the operator is shifting the pressing position into the key area β from the key area α or outside the key area β from the point (4) while applying the pressure load satisfying the predetermined standard load. The point (6) represents a state that the operator shifts out of the key area β from the point (5) while applying the pressure load satisfying the predetermined standard load. The point (7) represents a state that the operator shifts the pressing position outside the key area β from the point (6) while applying the pressure load satisfying the predetermined standard load. The point (8) represents the state that the operator releases the pressure.

Based on these operations, as illustrated in FIG. 8B, the tactile sensation providing apparatus 1 provides the first tactile sensation at the point (3) and the second tactile sensation at the point (4). Further, the tactile sensation providing apparatus 1 provides the first tactile sensation again at the point (5) and the second tactile sensation again at the point (6). At the point (2), although the pressure load satisfies the predetermined standard load Pth, the tactile sensation providing apparatus 1 does not provide a tactile sensation. At the point (7), also, although the pressure load stops satisfying the predetermined standard load Pth, the tactile sensation providing apparatus 1 does not provide a tactile sensation.

According to the tactile sensation providing apparatus 1 of the present embodiment, as described above, the operator may obtain the first tactile sensation when shifting the pressing position into the key area α or the key area β maintaining the pressure load satisfying the predetermined standard load Pth. According to the tactile sensation providing apparatus 1, also, the operator may obtain the second tactile sensation when shifting the pressing position out of the key area α or the key area β while maintaining the pressure load satisfying the predetermined standard load Pth. Accordingly, in shifting the pressing position across a plurality of key areas using the touch sensor, the operator may obtain the tactile sensations similar to those obtained when operating the key or the like constructed by using the mechanical switch. As described above, the tactile sensation providing apparatus 1 of the present embodiment, when a plurality of objects are arranged having a space therebetween, may appropriately provide the first tactile sensation and the second tactile sensation based on an existence of the object.

Figure 9A:
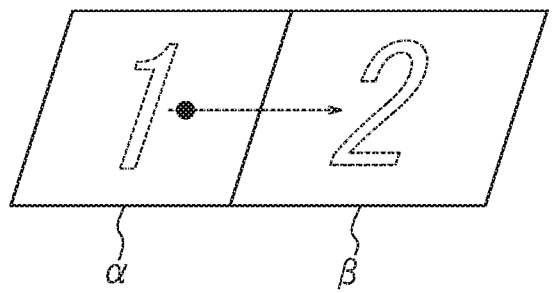
FIGS. 9A to 9C are diagrams illustrating a mode of pressure received by the tactile sensation providing apparatus according to the embodiment of the present invention.
Figure 9B:
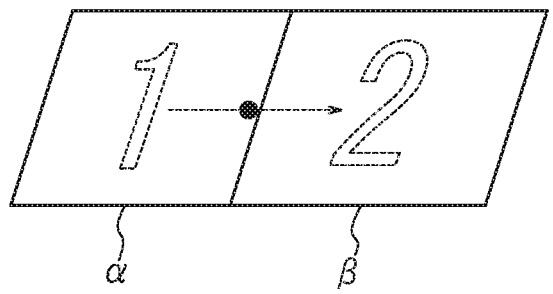
Figure 9C:
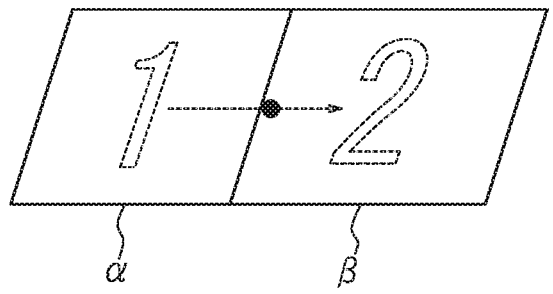

FIGS. 9A to 9C are diagrams illustrating a state when a plurality of objects are arranged adjacent to one another and the pressing position shifts from one object to another object adjacent thereto. In FIGS. 9A to 9C, an object "1" defined by the key area α and an object "2" defined by the key area β are arranged adjacent to one another. In FIGS. 9A to 9C, also, a black dot represents the pressing position on the touch sensor 11 by the operator. FIG. 9A and FIG. 9B sequentially illustrate a shift of the pressing position by the operator from the left side to the right side on the touch sensor 11. Here, as illustrated in FIGS. 9A to 9C, a case that the pressing position on the touch sensor 11 is detected as a "point" will be described. However, even when the pressing position is detected based on its area due to a specification of the touch sensor 11, the control unit 15 calculates a center or a centroid of the area such that the pressing position may be processed as a substantive point.

FIG. 9A is a diagram illustrating a state that the operator, after the first tactile sensation is provided (step S15) as the operator applies the pressure load satisfying the predetermined standard load on the object "1" defined by the key area α, shifts the pressing position to the right while maintaining the pressure load. At this time, the operation proceeds through Yes at step S21 to No at step S22. Next, FIG. 9B is a diagram illustrating a state that the operator shifts the pressing position to the right while maintaining the pressure load and thereby the pressing position has reached an edge of the object "1" defined by the key area α. At this time also, the operation proceeds through Yes at step S21 to No at step S22. Next, FIG. 9C illustrates a state that the operator further shifts the pressing position to the right while maintaining the pressure load and thereby the pressing position shifts out of the object "1" defined by the key area α and, simultaneously, shifts into the object "2" defined by the key area β. At this time, the process proceeds to Yes at step S22 almost simultaneously with Yes at step S23.

When two objects are adjacent to each other as described above and the slide operation is performed to these objects, the pressing position shifts out of the key area and simultaneously shifts into another key area of the adjacent key. In such a case, the tactile sensation providing apparatus 1 according to the present embodiment provides, instead of the first tactile sensation together with the second tactile sensation, a tactile sensation different from the first tactile sensation and the second tactile sensation as described above.

Figure 10A:
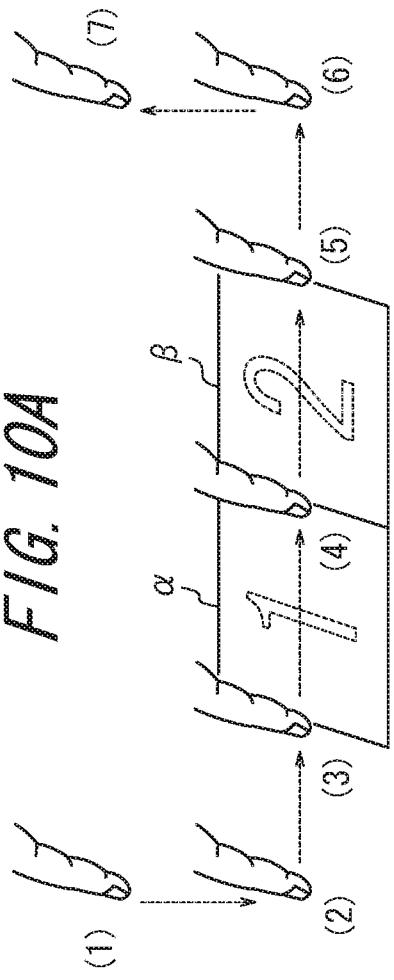
FIGS. 10A and 10B are diagrams illustrating other examples of the pressure load detected by the tactile sensation providing apparatus and the operation by the tactile sensation providing apparatus according to the embodiment of the present invention.
Figure 10B:
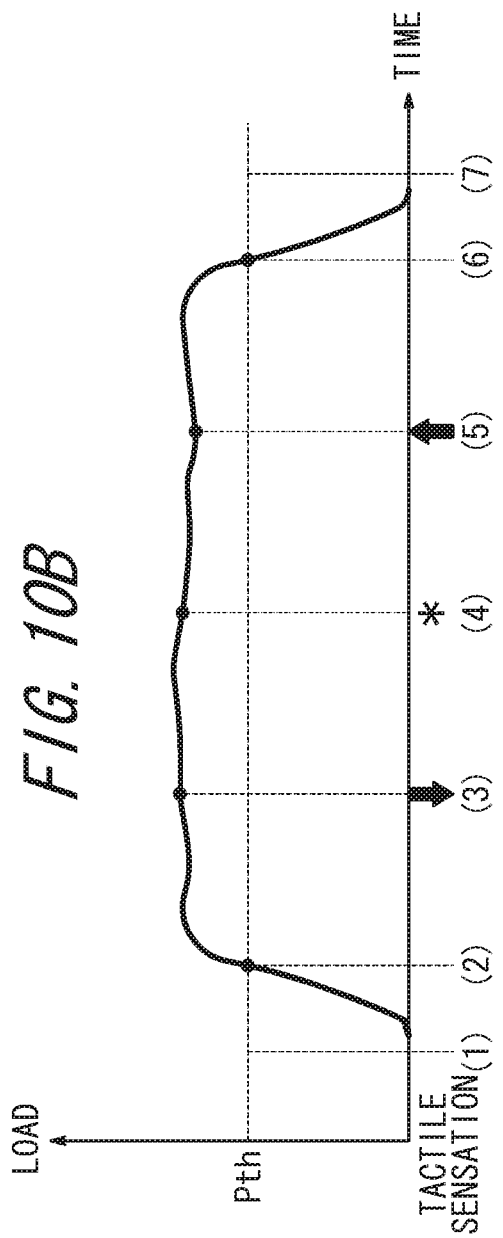

FIGS. 10A and 10B are diagrams illustrating the pressure load detected by the tactile sensation providing apparatus 1 and an operation by the tactile sensation providing apparatus 1 according to the embodiment of the present invention when two objects are arranged adjacent to each other as illustrated in FIGS. 9A to 9C.

FIG. 10A is a diagram schematically illustrating a state that the operator's finger presses outside the key area $\alpha$, shifts into the key area $\alpha$ and then into the key area $\beta$ while maintaining the pressure, then shifts out of the key area $\beta$ and releases the pressure. The tactile sensation providing apparatus 1 according to the present embodiment, when the pressing position shifts across a plurality of key areas adjacent to one another, performs an operation different from the operation described with reference to FIGS. 8A and 8B.

As illustrated in FIG. 10A, the point (1) represents the state that the operator is about to press outside the key area $\alpha$ and the point (2) represents the state that the operator is pressing outside the key area $\alpha$ while applying the pressure load satisfying the predetermined standard load. The point (3) represents the state that the operator shifts the pressing position into the key area $\alpha$ from the point (2) while applying the pressure load satisfying the predetermined standard load. The point (4) represents a state that the operator shifts the pressing position out of the key area $\alpha$ from the point (3) while applying the pressure load satisfying the predetermined standard load.

The point (5) represents a state that the operator shifts the pressing position out of the key area $\beta$ from the point (4) while applying the pressure load satisfying the predetermined standard load. The point (6) represents a state that the operator shifts the pressing position outside the key area $\beta$ from the point (5) while applying the pressure load satisfying the predetermined standard load. The point (7) represents the state that the operator releases the pressure.

Based on these operations, the tactile sensation providing apparatus 1, as illustrated in FIG. 10B, provides the first tactile sensation at the point (3). At the point (4), however, the tactile sensation providing apparatus 1 provides, instead of the first tactile sensation together with the second tactile sensation, the tactile sensation different from the first tactile sensation and the second tactile sensation. In FIG. 10B, an asterisk (*) under the time axis at the point (4) indicates that the tactile sensation different from the first tactile sensation and the second tactile sensation such as, for example, the "flick" sensation is provided. Also, the tactile sensation providing apparatus 1 provides the second tactile sensation again at the point (5). At the point (2), although the pressure load satisfies the predetermined standard load Pth, the tactile sensation providing apparatus 1 does not provide a tactile sensation. At the point (6), also, although the pressure load stops satisfying the predetermined standard load Pth, the tactile sensation providing apparatus 1 does not provide a tactile sensation.

According to the tactile sensation providing apparatus 1 of the present embodiment, as described above, the operator may obtain the first tactile sensation when shifting the pressing position into the key area $\alpha$ or the key area $\beta$ while maintaining the pressure load satisfying the predetermined standard load Pth. According to the tactile sensation providing apparatus 1, also, the operator may obtain the second tactile sensation when shifting the pressing position out of the key area $\alpha$ or the key area $\beta$ while maintaining the pressure load satisfying the predetermined standard load Pth. According to the tactile sensation providing apparatus 1, further, the operator may obtain the tactile sensation different from the first tactile sensation and the second tactile sensation when shifting the pressing position from the key area $\alpha$ to the key area $\beta$ while maintaining the pressure load satisfying the predetermined standard load Pth. Accordingly, when shifting the pressing position across a plurality of key areas using the touch sensor, the operator may obtain tactile sensations similar to those obtained when operating the key or the like constructed by using the mechanical switch without the feeling of strangeness. Also, since the tactile sensation different from the first tactile sensation and the second tactile sensation is provided at this time, the operator may unfailingly recognize that the slide operation across the key areas is appropriately received. As described above, the tactile sensation providing apparatus 1 according to the present embodiment, when a plurality of objects are arranged adjacent to one another and the slide operation is performed across the plurality of objects, provides the tactile sensation different from the first tactile sensation and the second tactile sensation.

FIGS. 11A to 11D are diagrams illustrating another example of a mode of the pressing position shifting between objects adjacent to one another when a plurality of objects are arranged adjacent to one another. FIG. 11A to FIG. 11D sequentially illustrate a gradual shift of the pressing position on the touch sensor 11 by the operator from the left to the right. Although the object "1" defined by the key area $\alpha$ and the object "2" defined by the key area $\beta$ are arranged side by side in FIGS. 11A to 11D, these objects are not completely in contact with each other but have a small space therebetween. Note that, according to the present embodiment, "when a plurality of objects are arranged adjacent to one another" includes the state that a plurality of objects are not completely in contact with each other, as described above. In FIGS. 11A to 11D, similarly to FIGS. 9A to 9C, the pressing position by the operator on the touch sensor 11 is denoted by the black dot.

Figure 11A:
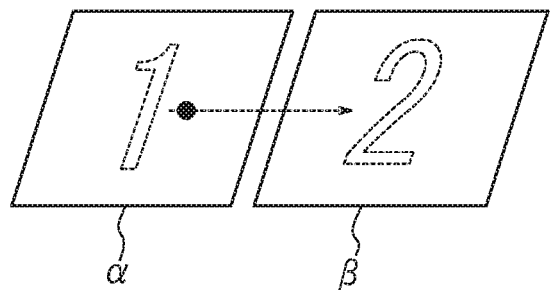
FIGS. 11A to 11D are diagrams illustrating another mode of pressure received by the tactile sensation providing apparatus according to the embodiment of the present invention.
Figure 11B:
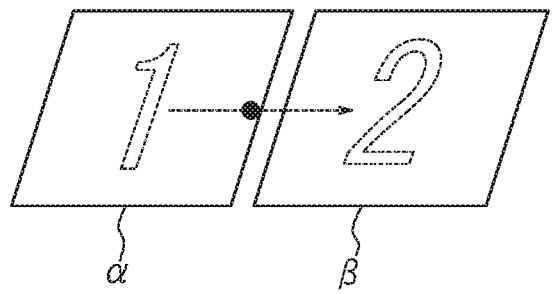
Figure 11C:
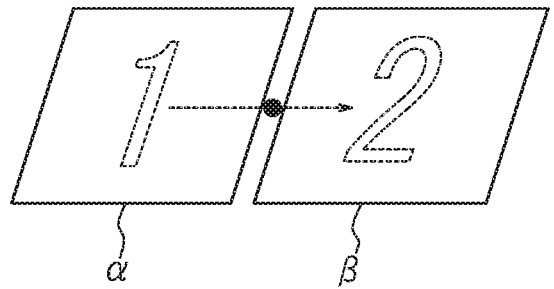
Figure 11D:
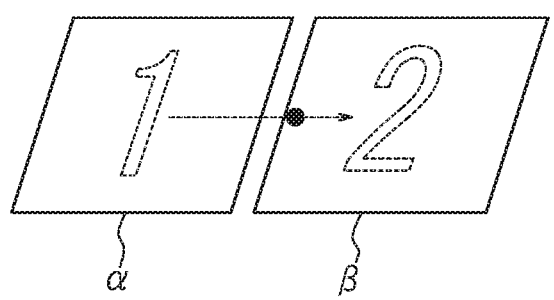

FIG. 11A illustrates a state that, after the operator applies the pressure load satisfying the predetermined standard load on the object "1" defined by the key area $\alpha$ and thus the first tactile sensation is provided (step S15), the operator is about to shift the pressing position to the right while maintaining the pressure load. At this time, the operation proceeds through Yes at step S21 to No at step S22. Next, FIG. 11B illustrates a state that the operator shifts the pressing position to the right while maintaining the pressure load and the pressing position reaches the edge of the object "1" defined by the key area $\alpha$. At this time also, the operation proceeds through Yes at step S21 to No at step S22. Next, FIG. 11C illustrates a state after the operator further shifts the pressing position to the right while maintaining the pressure load such that the pressing position shifts out of the object "1" defined by the key area $\alpha$ and immediately before shifts into the object "2" defined by the key area $\beta$. At this time, the operation proceeds to Yes at step S22. Next, FIG. 11D illustrates a state that the operator further shifts the pressing position to the right while maintaining the pressure load and the pressing position shifts into the object "2" defined by the key area β. At this time, the operation proceeds to Yes at step S23.

In such a case, the control unit 15 waits for a predetermined short time after the pressing position shifts out of the key area at step S22 in FIG. 4 before determining whether the pressing position has shifted into the key area of the adjacent key at step S23. However, if the control unit 15 waits for too long, a timing to provide the second tactile sensation may be delayed when the pressing position shifts out of the key area. Accordingly, it is preferable to set the time to be relatively short.

Also, when the touch sensor detects the pressing position not as the "point" but based on the area, it is possible to determine that, when the area of the pressing position is detected in a key area and also in an adjacent key area across a borderline therebetween, the pressing position has shifted into the adjacent key area.

In a case that two objects are arranged adjacent to each other having a small space therebetween as described above, when the slide operation is performed to these adjacent objects, the pressing position shifts out of the key area and almost simultaneously into the adjacent key area. In such a case also, the tactile sensation providing apparatus 1 according to the present embodiment provides, instead of the first tactile sensation together with the second tactile sensation, the tactile sensation different from the first tactile sensation and the second tactile sensation. In such a case, these two objects are considered to be substantially adjacent to each other even when having a small space therebetween.

It is to be understood that the present invention is not limited to the above embodiment but may be modified or varied in a multiple of manners. For example, although in the above embodiment the first tactile sensation is the click sensation and the second tactile sensation is the release sensation and these tactile sensations are different from each other, the first tactile sensation and the second tactile sensation may be the same tactile sensation. For example, also, although there is no mention about whether to generate a sound at each operation in the above embodiment, a sound generated in conjunction with the operation may further improve operability of the tactile sensation providing apparatus and reduce generation of erroneous inputs. Moreover, although the touch face of the touch sensor has one or two key areas for the sake of simplification in the embodiment set forth above, it is appreciated that three or more key areas may be provided. In the embodiment set forth above, further, although the pressing position of the operation by the operator shifts only sideways for the sake of simplicity, it is appreciated that the pressing position may shift in any direction including a vertical direction.

In addition, the load detection unit in the above embodiment may be configured by using any number of strain gauge sensors. Moreover, the load detection unit may be configured according to an input detection scheme of the touch sensor. For example, in using the resistive film type, the load detection unit may be configured without using the strain gauge sensor when the load may be detected from a change of an output signal based on a resistance change in accordance with a contact area. Or, in using the capacitive type, the load detection unit may be configured without using the strain gauge sensor when the load may be detected from a change in the output signal based on a change in capacitance.

In addition, the tactile sensation providing unit may be configured by using any number of piezoelectric vibrators, transparent piezoelectric elements provided on an entire operation surface of the touch sensor or, when capable of vibrating such that the tactile sensation is provided, an eccentric motor which rotates, for example, 360 degrees in 1 cycle of the drive signal to vibrate the housing such that the touch sensor is indirectly vibrated. Moreover, when both of the load detection unit and the tactile sensation providing unit are configured by using the piezoelectric elements, these units may share the piezoelectric elements to function as a load detection/tactile sensation unit.

According to the tactile sensation providing apparatus of the present invention, the tactile sensation providing unit is driven when the pressure load detected by the load detection unit satisfies the predetermined standard load. In this case, "when the pressure load detected by the load detection unit satisfies the predetermined standard load" may include such times as when the pressure load detected by the load detection unit reaches a value of the predetermined standard load, when the pressure load detected by the load detection unit exceeds the value of the predetermined standard load or when the value of the predetermined standard load is detected by the load detection unit.

REFERENCE SIGNS LIST 11 touch sensor
11a touch face
12 load detection unit
13 tactile sensation providing unit
14 display unit
15 control unit
21 housing
22 insulator
23 upper cover
24 insulator
31 strain gauge sensor
32 piezoelectric vibrator

The invention claimed is:

1. A tactile sensation providing apparatus comprising:
    a touch sensor;
    a load detection unit configured to detect a pressure load on a touch face of the touch sensor;
    a tactile sensation providing unit configured to provide a click sensation, a flick sensation, and a release sensation to the touch face; and
    a control unit configured to control that the tactile sensation providing unit provides the click sensation when detecting the pressure load satisfying a pressure load for providing the click sensation in a button object, wherein
    the control unit controls that the tactile sensation providing unit provides the release sensation when detecting the pressure load satisfying a pressure load for providing the release sensation in a button object,
    the control unit controls that the tactile sensation providing unit provides the flick sensation between the click sensation and the release sensation, and
    the flick sensation is different than the click sensation and the release sensation.

2. A tactile sensation providing apparatus according to claim 1, wherein
    the release sensation is provided after the click sensation.

3. A tactile sensation providing apparatus according to claim 1, wherein
    the pressure load for providing the release sensation is the same as the pressure load for providing the click sensation.

4. A tactile sensation providing apparatus according to claim 1, wherein
the pressure load for providing the release sensation is set lower than the pressure load for providing the click sensation.

5. A tactile sensation providing apparatus according to claim 1, wherein
the click sensation is a button depression sensation.

6. A tactile sensation providing apparatus according to claim 1, wherein
the release sensation is a button recovery sensation.

7. A method for providing a tactile sensation to a tactile sensation apparatus, the tactile sensation apparatus including a touch sensor, a load detection unit, a tactile sensation providing unit, and a control unit, the method comprising:
detecting, by the load detection unit, a pressure load applied to a touch face of the touch sensor; and
providing, by the tactile sensation providing unit, a click sensation, a flick sensation, and a release sensation to the touch face; wherein
in response to the load detection unit detecting that the pressure load is provided within a button object and satisfies a pressure load for providing the click sensation, the control unit controls the tactile sensation providing unit to provide the click sensation,
in response to the load detection unit detecting that the pressure load is provided within the button object and satisfies a pressure load for providing the release sensation, the control unit controls the tactile sensation providing unit to provide the release sensation,
in response to the load detection unit detecting that the pressure load is shifted from the button object into an adjacent button object, the control unit controls the tactile sensation providing unit to provide the flick sensation between the click sensation and the release sensation, and
the flick sensation is different than the click sensation and the release sensation.

8. The method for providing a tactile sensation to a tactile sensation apparatus according to claim 7, wherein
the release sensation is provided after the click sensation.

9. The method for providing a tactile sensation to a tactile sensation apparatus according to claim 7, wherein
the pressure load for providing the release sensation is the same as the pressure load for providing the click sensation.

10. The method for providing a tactile sensation to a tactile sensation apparatus according to claim 7, wherein
the pressure load for providing the release sensation is set lower than the pressure load for providing the click sensation.

11. The method for providing a tactile sensation to a tactile sensation apparatus according to claim 7, wherein
the click sensation is a button depression sensation.

12. The method for providing a tactile sensation to a tactile sensation apparatus according to claim 7, wherein
the release sensation is a button recovery sensation.

* * * * *